March 14, 1950  R. C. SYLVANDER  2,500,585
DISTANCE PER UNIT OF FUEL MEASURE INDICATOR
Filed Oct. 12, 1943  5 Sheets-Sheet 1

INVENTOR.
Roy C. Sylvander
BY Herbert M. Birch
ATTORNEY

March 14, 1950  R. C. SYLVANDER  2,500,585
DISTANCE PER UNIT OF FUEL MEASURE INDICATOR
Filed Oct. 12, 1943  5 Sheets-Sheet 4

INVENTOR.
Roy C. Sylvander.
BY Herbert M. Birch.
ATTORNEY

March 14, 1950 R. C. SYLVANDER 2,500,585
DISTANCE PER UNIT OF FUEL MEASURE INDICATOR
Filed Oct. 12, 1943 5 Sheets-Sheet 5
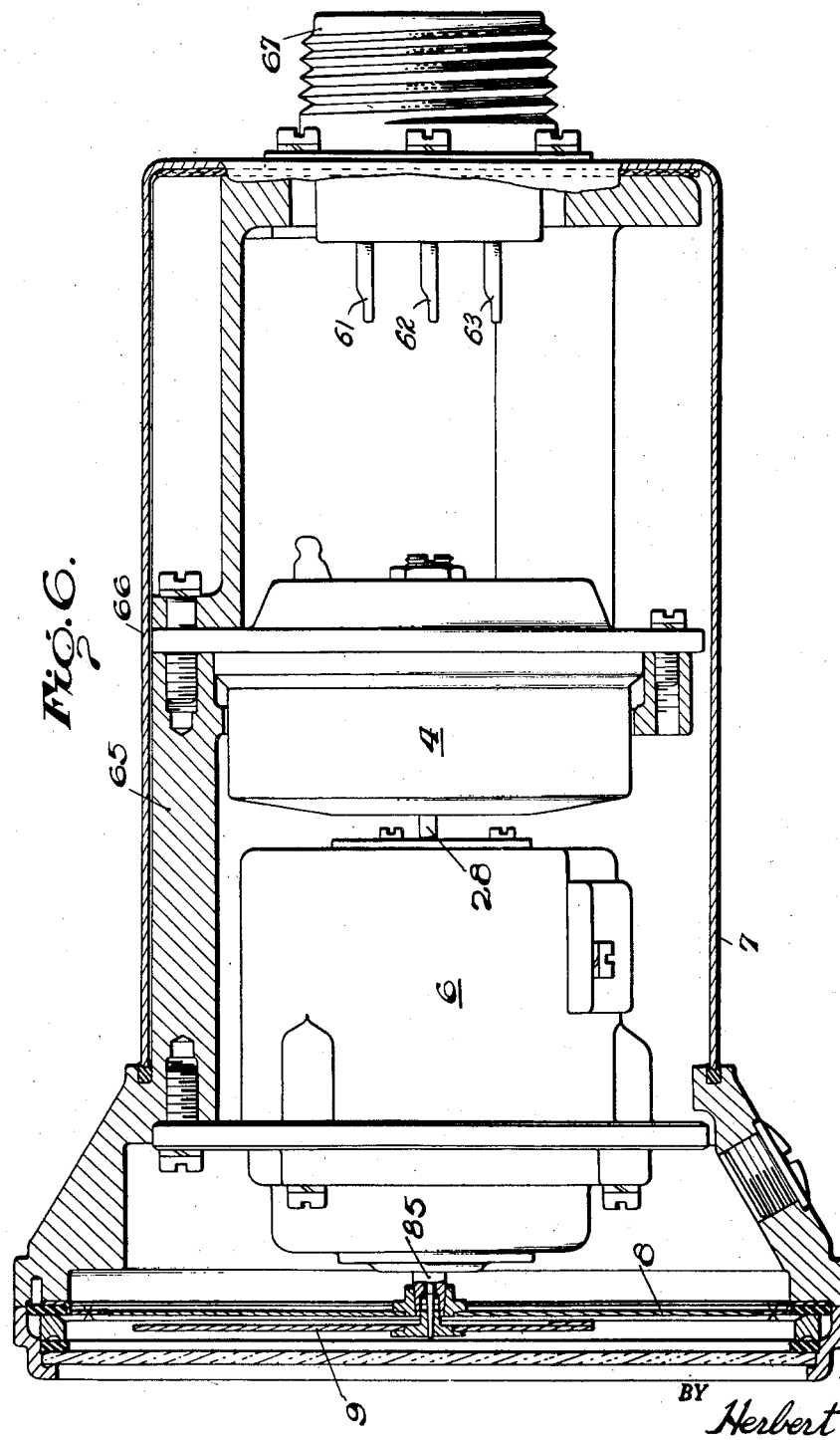
INVENTOR.
Roy C. Sylvander
BY Herbert M. Birch
ATTORNEY Patented Mar. 14, 1950

2,500,585

UNITED STATES PATENT OFFICE 2,500,585

DISTANCE PER UNIT OF FUEL MEASURE INDICATOR

Roy C. Sylvander, Ridgewood, N. J., assignor to Bendix Aviation Corporation, Teterboro, N. J., a corporation of Delaware Application October 12, 1943, Serial No. 505,990

6 Claims. (Cl. 73—114)

The present invention relates to measuring and/or indicating systems and more particularly to a novel system for automatic computation of rate of fuel consumption of a mobile object in distance per unit quantity of fuel such as miles per gallon or pound.

Heretofore, systems and methods for indicating and automatically computing miles-per-gallon have been complex in construction, and include numerous mechanical parts subject to wear, so that the ultimate accuracy thereof is impaired. In the present system and method, however, inaccuracies from mechanical elements are substantially eliminated by the use of a novel combination of electrical expedients to replace the prior art mechanical structures.

An object of the present invention is to provide a novel system and method, whereby two functions are combined in a novel manner to produce the desired function, which may be the quotient of the original two functions.

Another object is to provide a novel indicating system, whereby the functions of airspeed and the functions of fuel flow may be automatically divided and the quotient, or the logarithmic functions of airspeed and fuel flow subtracted one from another and the difference indicated in miles-per-gallon.

Another object is to provide means adapted to determine optimum overall performance arranged in a novel combination, whereby two functions may be telemetrically transmitted to a remote indicator including a logarithmic scale on a movable dial and a logarithmically responsive movable pointer cooperating with or movable over and relative to the movement of the dial, so that the relative angle or angular displacement between the pointer and dial scale will give the quotient of the two logarithmic functions of speed in miles per hour divided by fuel flow or consumption in gallons or pounds per hour, or the logarithm of the quotient which is the difference of the logarithms of the functions to measure and visually indicate rate of fuel consumption in distance per unit quantity of fuel such as miles-per-gallon or pound, and because of the logarithmic scale, the result or quotient can be read directly.

A further object of the present invention is to provide a novel remote control system in which an indicator, or some other desired mechanism, located at a remote point may be controlled in accordance with a miles-per-gallon function originating at another point.

The above and other objects and advantages of the present invention will appear more fully hereinafter from a consideration of the detailed description which follows, taken together with the accompanying drawings wherein one embodiment of the invention is illustrated. It is to be expressly understood, however, that the drawings are for the purpose of illustration only and are not designed as a definition of the limits of the invention. Reference for this latter purpose should be had to the appended claims.

In the drawings, wherein like reference characters refer to like parts throughout the several views, Figure 1 is a schematic diagram of one embodiment of the present invention.

Figure 2A is a fragmentary, enlarged view of the logarithmic linkage of the airspeed indicator shown in Figure 2.

Figure 6 is a longitudinal section view of the master indicator, showing the airspeed repeater and pointer therefor, the fuel flow repeater and dial therefor, in their respective positions with respect to the indicator casing.

Figure 1:
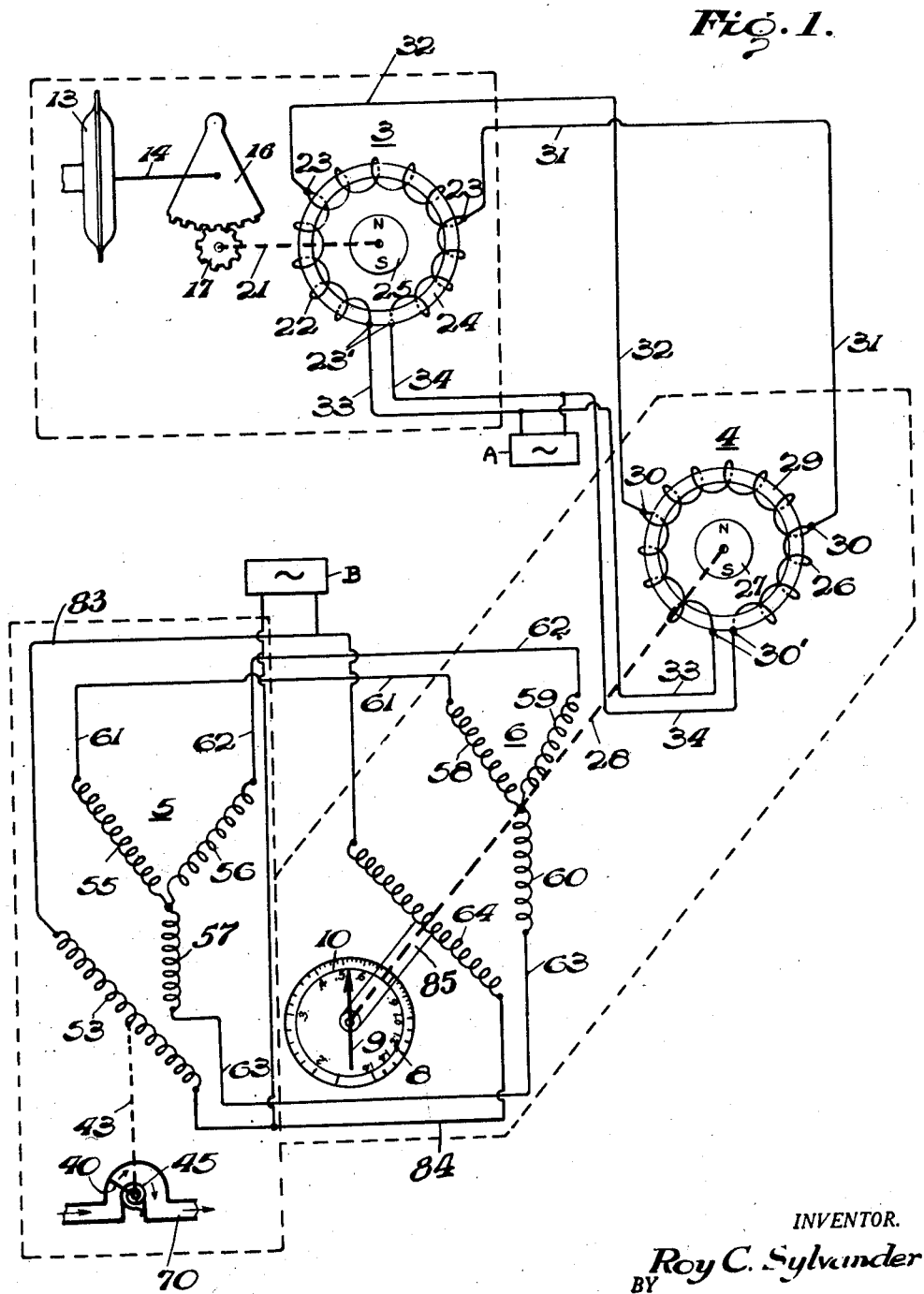
Figure 5:
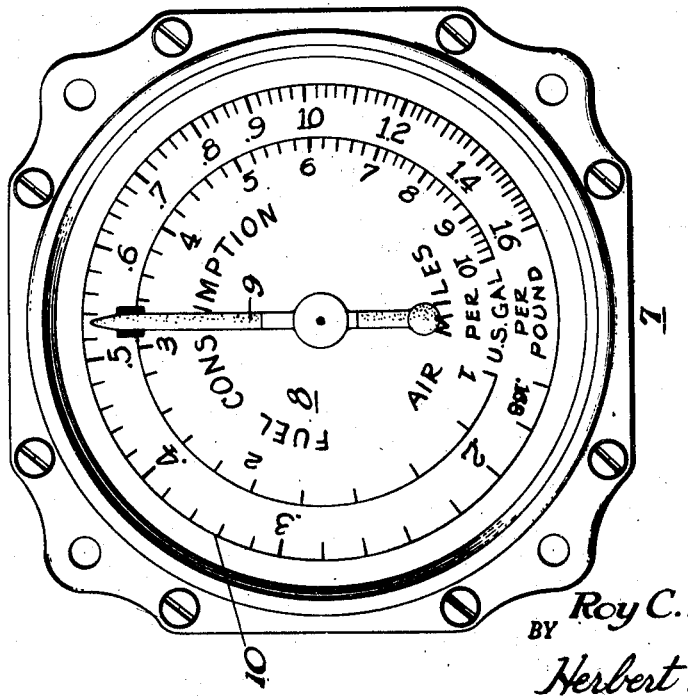
Figure 5 is a front view of the master indicator casing, showing the dial and pointer thereof.

Referring now to the drawings for a more detailed description of the present invention, and more particularly to Figure 1 thereof, there is shown an airspeed indicating system, which may be of the pressure differential type, having an electromagnetic transmitter 3 and an electromagnetic repeater or receiver 4 connected in circuit with the transmitter, a fuel flow indicating system having an electrical self-synchronous induction transmitter 5 and a self-synchronous repeater or receiver 6 in circuit with said transmitter, so arranged that the repeaters in each indicating system are housed and included in a master indicator 7, see Figures 5 and 6, having a dail 8 marked with a circular logarithmic scale 10 and rotatable by the fuel flow repeater 6, according to the logarithmic function of fuel flow, and a pointer 9 rotatable according to the logarithmic function of the airspeed repeated in the receiver 4.

Scale 10, see Figures 1 and 5, is marked on the rotatable dial 8 in miles per gallon or per pound, so that relative rotations of the dial and the logarithmically responsive pointer 9 actuated by fuel flow and airspeed respectively, will indicate their angular displacement on the slide rule principle.

Figure 2:
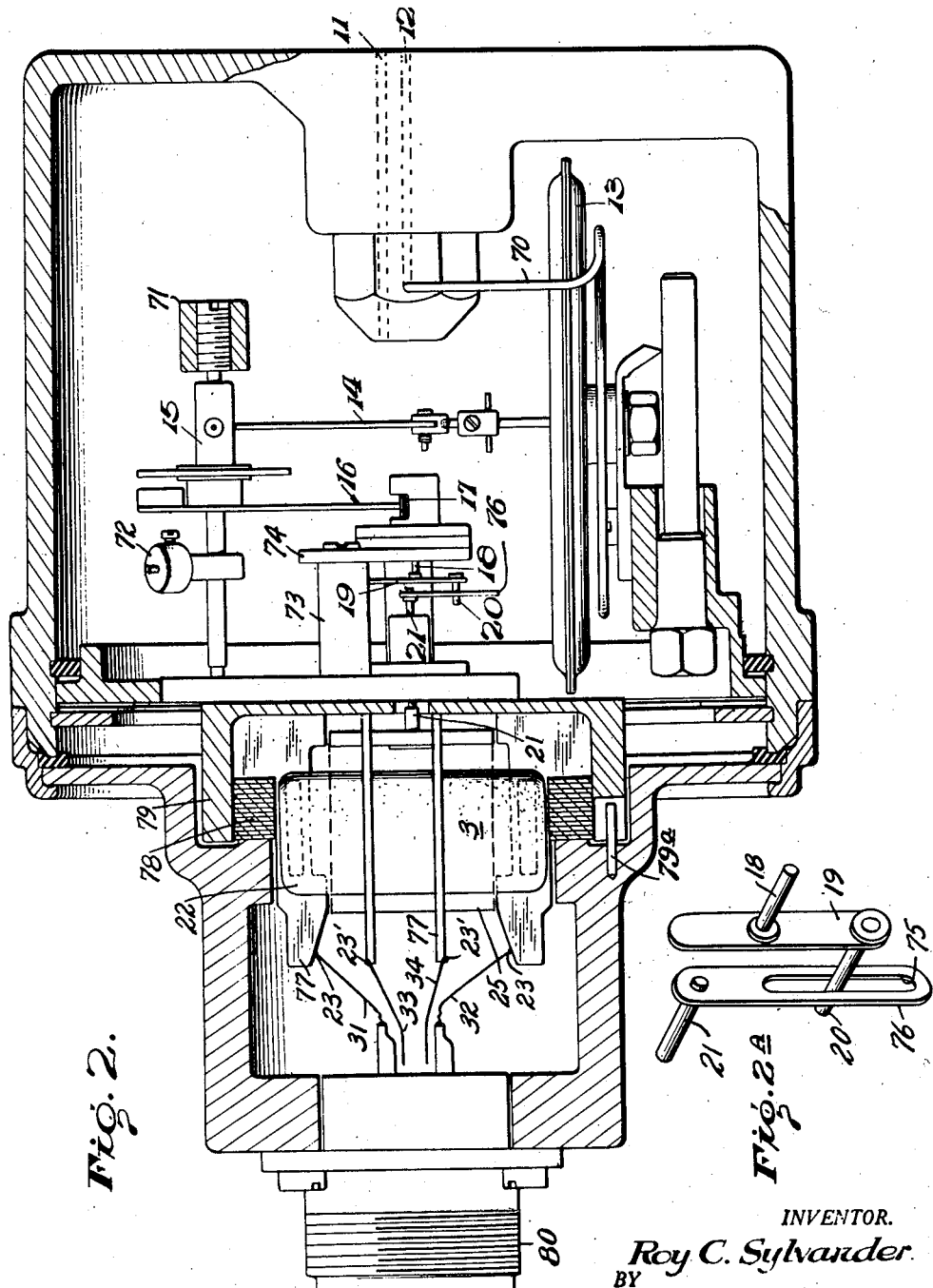
Figure 2 is one form of airspeed indicator, such as may be used in the diagram shown in Figure 1.

In Figure 2 is illustrated one form of airspeed device for determining the logarithm of airspeed such as may be used in the present system. It comprises a suitable casing having an opening 11 connected to the static pressure line of a Pitot tube (not shown) and an opening 12 connected to the dynamic pressure line of said Pitot tube. The opening 11 is connected to the interior of the airspeed indicator casing while the opening 12 is connected by line 70 to the interior of diaphragm 13. The differential pressure between the exterior of the diaphragm 13 due to the static pressure and the interior pressure of said diaphragm due to the dynamic pressure will, as is well known in the art, give a measure of airspeed.

Fixed to the exterior of the diaphragm 13 by suitable means is a link 14, the other end of which is adapted to oscillate a rock shaft 15 journaled at one end in the indicator casing and at the other end to a supporting arm 71. Fixed to said shaft is a sector gear 16, the teeth of which mesh with a pinion 17. A counterweight 72 is provided on shaft 15 to balance the weight of the sector gear 16 and the weight of the link 14.

Fixed within the airspeed indicator casing by suitable means is a spacer 73 supporting a plate or platform 74. Journaled through the plate 74 is a shaft 18, one end of which carries the pinion 17 meshing with the sector gear, the other end of which carries an arm 19. Fixed to one end of arm 19 is a pin 20. The pin 20 is received in a slot 75 cut into an arm 76 which is in turn fixed to a shaft 21 (Figure 2A) which passes through the indicator casing and carries at its other end the rotor 25 of the transmitter 3.

In operation, the expansion and contraction of the diaphragm 13 will oscillate the sector gear 16 to drive the pinion 17. Pinion 17 will in turn rotate the arm 19 to rotate the arm 76. Since shaft 18 and shaft 21 are eccentric to one another, the rotation of shaft 21 through the linkage of arm 19, pin 20 and arm 76 will be a function of the airspeed.

As is well known in the art, the deflection of the diaphragm will vary as the square of the velocity. Since the response of the diaphragm is a square function of the velocity, the coupling of the diaphragm to a dial pointer would result in unequal movements of the pointer for equal increases in speed. The dial would thus have to be laid out to the square function of the airspeed.

Common practice is to correct the diaphragm response so that its deflection is linear with respect to airspeed. In the present invention, however, the response of the diaphragm is not made linear but is corrected to give a modified non-linear response. The modified non-linear response of the diaphragm and the non-linear rotation of shaft 21 by the rotation of shaft 18 have been combined to give the logarithmic function of the airspeed as the input for the rotor 25 of the transmitter 3.

The transmitter 3 as shown in Figure 2 comprises a single stator winding or coil 22 wound about a plurality of Bakelite coil forms 77 and held in place thereon by a laminated field ring 78 and an aluminum cup 79. The aluminum cup is fixed within the airspeed indicator casing by suitable means, its rotation being prevented by a pin 79. Coil 22 is provided with four taps 23—23', said taps being connected by wires 31, 32, 33 and 34 to the plug receptacle 80 fixed to the end of said indicator casing.

Rotatably mountable within the field coil 22 is a permanent magnet rotor 25. For simplicity, the shaft 21 previously described, has been considered as supporting the rotor 25. It should be understood, however, that a gear train might very well be interposed between the shaft 21 as shown and a second shaft supporting the rotor 25. In this way, the slight deflections of the diaphragm 13 will be amplified to increase the angular displacement of the rotor.

In connection with the transmitter 3 is the repeater or receiver 4 forming a part of master indicator 7, as will be hereinafter described in detail with reference to Figure 6. The repeater 4 is of twin construction to transmitter 3 and includes a stator coil 26 and rotor 27.

The stator coil 26 may be similarly wound on a laminated annulus or ring core 29, as in the transmitter 3, which coil 26 is also tapped at two or more points as, for example, at points 30—30¹ for connection through conductors 31—32 and 33—34 to taps 23—23¹ of the transmitter coil 22.

The coils 22 and 26 are energized by either a single phase or a pulsating direct current from a suitable source A, as shown, connected to the leads 33—34.

Rotor 27 of repeater or receiver 4 is rotatably connected to pointer 9 on shaft 28, see Figures 1 and 6, for movement relative to rotatable dial 8 and scale 10 thereon. The dial 8 is fixedly mounted on tubular shaft 85 rotatably driven by fuel flow receiving device 6, to be described hereinafter, concentrically sleeved about pointer shaft 28 of the airspeed system.

The operation of the transmitter 3 and receiver 4 is fully described in Patent No. 2,342,637, issued February 29, 1944, to Paul F. Bechberger.

To obtain the logarithmic function of fuel flow, a flowmeter 81 has a movable vane 40 in a metering chamber 41 provided within casing 42 of the flowmeter. A by-pass valve 82 permits the flow of fuel to the motor in the event the flowmeter fails. Vane 40 is suitably secured to a shaft 43 journaled in side walls 47, 48 of casing 42. One end of a calibrated spiral spring 45 is fixed to one end of shaft 43 and the other end of the spring is fixed to a lug 46 on casing wall 47. Spring 45 holds vane 40 in a normal position, as shown in dotted lines at the left of Figure 4, and opposes movement of the vane upon flow of fuel through the meter. A friction damping mechanism 44 of any suitable kind is fixed to the spring end of shaft 43 by suitable means to reduce the fluttering of vane 40.

Fixed to the opposite end of shaft 43 is a magnetic transmitting device within a housing 50 supporting the transmitter 5. The magnetic transmitting device includes a permanent magnet 49 rotatable in an auxiliary chamber formed by a cup 52 of the housing 50, which serves as a liquid-tight seal for isolating the transmitter 5 from the destructive action of fuel vapors.

Fixed to transmitter shaft 35 by suitable means is a second permanent magnet 51 disposed about cup 52 to cooperate with magnet 49. Rotation of magnet 49 rotates magnet 51 due to the magnetic flux linkage between the two magnets. Rotation of vane 40 by fuel flowing through the meter is transmitted by shaft 43, and magnet 49 to magnet 51 and shaft 35.

Figure 4:
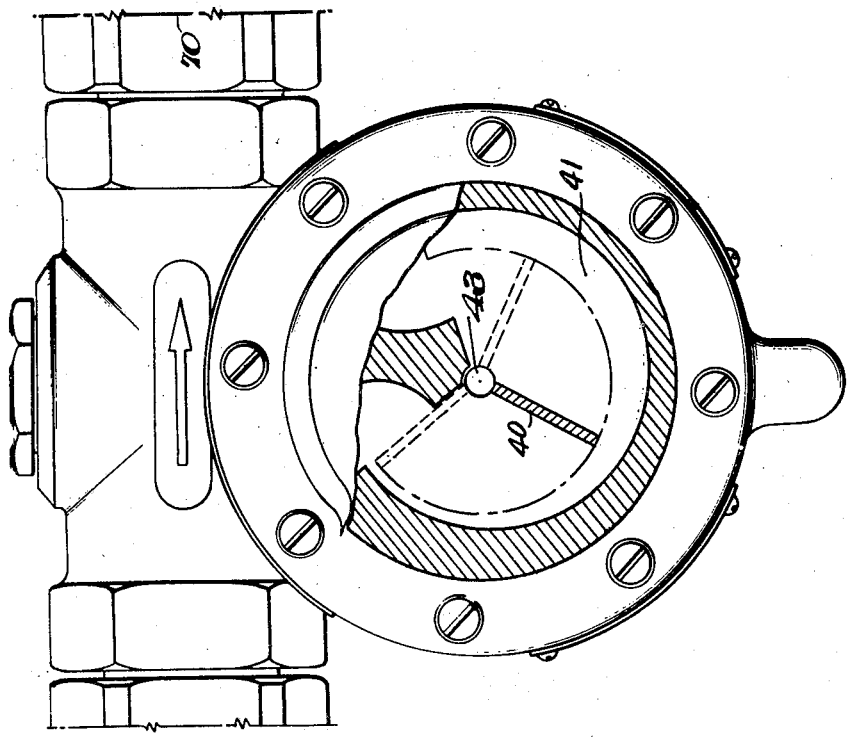
Figure 4 is a front view partly broken away to show the metering vane and the spiral formed metering chamber.

To obtain the logarithmic function of fuel flow through meter 81, metering chamber 41 is hyperbolic or spiral in shape, as shown in Figure 4. As the rate of fuel flow through the meter increases, the vane rotates in a counter-clockwise direction and the opening between the end of vane 40 and the spiral wall of metering chamber 41 increases. For a slower rate of fuel flow, vane 40 is moved a proportionately lesser distance than for a greater rate of fuel flow. During periods of greater fuel flow the opening between vane 41 and the spiral wall of the metering chamber is greater, thus permitting the fuel to by-pass the vane. By proper design of the metering chamber, the rotation of shaft 43 may be made to give a logarithmic function of the rate of fuel flow through the meter.

Transmitter 5 includes a wound rotor 53 on shaft 35 and a stator winding having three Y-connected coils 55, 56 and 57 connected by wires 61, 62 and 63 in parallel with Y-connected stator coils 58, 59 and 60 of receiver 6 (Figure 1). Rotor coils 53 and 64 of the transmitter and receiver, respectively, are also connected in parallel by leads 83 and 84; and in parallel to a suitable source of alternating current, as indicated at B in Figure 1.

Rotation of the rotor coil 53 by vane 40 induces a voltage in the stator coils 55, 56 and 57 which appears in stator coils 58, 59 and 60 of the receiver. The reaction of the resultant magnetic field in the receiver stator windings with the field set up in the rotor winding 64 due to source B causes rotor 64 to turn to a null position; thus taking up the same position as that to which transmitter rotor 53 has been moved by the vane.

Rotation of rotor coil 64 rotates shaft 85 to which is affixed dial 8. Since rotation of rotor 53 is a logarithmic function of the rate of fuel flow, it follows that movement of dial 8 is also a logarithmic function of the rate of fuel flow.

The coaction of dial 8 and pointer 9 is similar to the division performed on a circular slide rule. Since the movements of the dial and pointer are logarithmic functions of two quantities, the movement of the dial from its zero position will set up the logarithmic dividend. Movement of the pointer with respect to the dial will subtract the logarithmic divisor from the logarithmic dividend. The reading of the pointer with respect to the dial gives the logarithmic quotient.

Dial 8 is accordingly laid off in a logarithmic scale of miles per gallon, or pound of fuel (Figure 5). Reading of the dial and pointer gives the mileage per unit of fuel consumption.

In Figure 6 is shown a master indicator, such as may be employed in the present system, comprising a frame 65 and casing 66 housing and supporting the respective airspeed receiver 4 and the fuel flow receiver 6 in tandem. Coupling connection 67 receives leads 61, 62 and 63 of the fuel meter transmitter stator, and leads 31—32, 33—34, of the airspeed meter stator coil 22.

The rotor shaft 85 of the fuel flow receiver 6 is hollow and the rotor shaft 28 of the airspeed receiver 4 passes through the hollow rotor shaft 85 and carries pointer 9. The shaft 28 may have a coupling joint, not shown, between the receiver units 4 and 6 adapted to permit separation of the two units for inspection and repair.

Operation

When the airspeed device 13 is actuated the rotor 25 of the electrical transmitter 3 is turned and shifts the fields therein and produces a corresponding shift in the fields of the electrical repeater 4. Consequently, the rotor 27 of the repeater 4 is rotated, and through any suitable means, such as a shaft 28, the logarithmically responsive pointer 9 attached to shaft 28 is obviously thereby rotated around or relative to the dial 8 and logarithmic scale 10 in proportion to the logarithm of airspeed.

Figure 3:
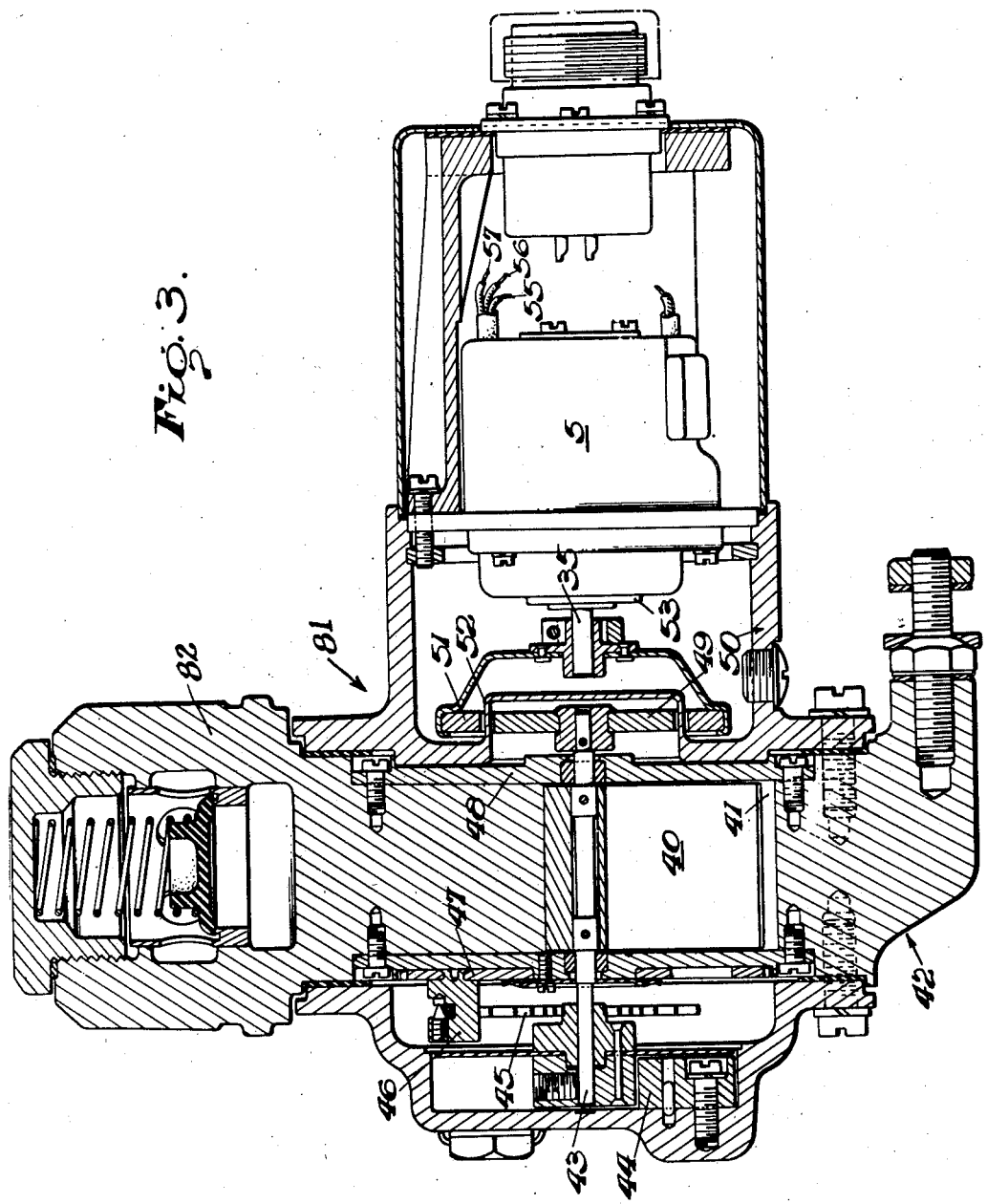
Figure 3 is one form of fuel flowmeter, such as may be used in the diagram shown in Figure 1.

The synchronous induction transmitting device 5 of the fuel flowmeter with the previously described three phase stator coils 55, 56 and 57, and the rotor 53 connected to the fuel flowmeter vane 40 which moves in response to fuel flow against resistance of spring 45, shown in Figures 1 and 3, operates as follows. Upon flow of fuel through the intake manifold pipe 70, the induced voltages in the stator coils of the induction transmitter 5 are varied due to the displacement of rotor 53 by vane 40 of the flowmeter. The coils of said transmitter 5 then set up a similar field in the coils 58, 59 and 60 of induction receiver 6 and the rotor 64 thereof is rotated through an angle corresponding to the fuel flow vane 40 and rotor 53 of transmitter 5. The rotor 64 of the receiver 6 is connected by tubular shaft 85 to rotate dial 8, on which is logarithmic scale 10 adjacent the logarithmic responsive pointer 9. The relative rotation between dial scale 10 and pointer 9 provides for the division of airspeed in units of distance per unit of time by fuel flow in units of quantity per unit of time or the subtraction of the two logarithmic functions such as that of fuel flow, in gallons or pounds per hour from that of speed such as miles per hour, which gives miles per gallon or pound and because of the logarithmic scale 10 the quotient can be read directly.

Thus by a novel electro-mechanical automatic system designed for rotation of a pair of indicator members, such as scale 10 and pointer 9, the logarithmic function of fuel flow is obtained in pounds or gallons of fuel per hour and the logarithmic function of airspeed is obtained in knots or air miles-per-hour; and upon rotation of both logarithmic dial scale 10 and pointer 9, the difference in relative angular displacements becomes the difference of the logarithms of the functions which is the logarithm of the quotient of the number of speed units divided by the number of fuel flow units, and the quotient of the two functions is indicated directly on the dial scale 10 by pointer 9 to give readings in air miles-per-gallon.

Although the present invention is only described as a telemetric system and illustrated in detail for one embodiment thereof, it is to be expressly understood that the same is not limited to such telemetric systems, as the indications may be transmitted by direct take-off means. Various changes may also be made in the design and arrangement of the parts illustrated as will now be apparent to those skilled in the art. For a definition of the limits of the invention, reference should be had to the appended claims.

What is claimed is:

1. An indicating system for an automotive vehicle comprising, a movable dial, a logarithmic scale on said dial in linear distance per units of fuel measure, a pointer for said dial movable relative thereto, a flowmeter having a spiral shaped metering chamber and a vane in said chamber actuated by the passage of fuel therethrough, the movement of said vane being a logarithmic function of the rate of fuel movement; a synchronous transmitter operable by the movement of said vane, an airspeed measuring device having a diaphragm actuated by the pressure differential of a Pitot tube, an eccentric linkage actuated by the movement of the diaphragm, and an output shaft driven by said linkage in proportion to the logarithmic function of the airspeed of the vehicle; a second synchronous transmitter operable by the movement of said shaft, and a receiver connected to each of said transmitters to move said dial and said pointer respectively, relative to each other to give the efficiency rating of the vehicle in linear distance per unit of fuel measured.

2. An indicating system for an automotive vehicle comprising, a movable dial, a logarithmic scale on said dial in linear distance per units of fuel measure, a pointer for said dial movable relative thereto, a flowmeter having a spiral shaped metering chamber and a vane in said chamber actuated by the passage of fuel therethrough, the movement of said vane being a logarithmic function of the rate of fuel movement; an airspeed measuring device having a diaphragm actuated by the pressure differential of a Pitot tube, an eccentric linkage actuated by the movement of the diaphragm, and an output shaft driven by said linkage in proportion to the logarithmic function of the airspeed of the vehicle; and a telemetering circuit responsive to the movement of said vane and said output shaft to angularly displace said dial and said pointer relative to each other to give the efficiency rating of the vehicle in linear distance per unit of fuel measure.

3. An indicating system for an automotive vehicle comprising, a movable dial, a logarithmic scale on said dial in linear distance per unit of fuel measure, a pointer for said dial movable relative thereto, a flowmeter having a spiral shaped metering chamber and a vane in said chamber actuated by the passage of fuel therethrough, the movement of said vane being a logarithmic function of the rate of fuel movement; a telemetering circuit interconnecting said vane and said dial to move said dial, a velocity measuring device having an output shaft, an eccentric linkage, and means responsive to the velocity of the vehicle to actuate said linkage to drive said output shaft in proportion to the logarithmic function of the vehicle velocity; and a telemetering circuit interconnecting said shaft and said pointer to move said pointer relative to said dial to give the efficiency rating of the vehicle in linear distance per unit of fuel measure.

4. An indicating system for an automotive vehicle comprising, a movable dial, a logarithmic scale on said dial in linear distance per unit of fuel measure, a pointer for said dial movable relative thereto, a flowmeter having a spiral shaped metering chamber and a vane in said chamber actuated by the passage of fuel therethrough, the movement of said vane being a logarithmic function of the rate of fuel movement; a velocity measuring device having an output shaft, an eccentric linkage, and means responsive to the velocity of the vehicle to actuate said linkage to drive said output shaft in proportion to the logarithmic function of the vehicle velocity; and a telemetering circuit responsive to the movement of said vane and said output shaft to angularly displace said dial and said pointer relative to each other to give the efficiency rating of the vehicle in linear distance per unit of fuel measure.

5. An indicating system for an automotive vehicle comprising, a movable dial, a logarithmic scale on said dial in linear distance per units of fuel measure, a pointer for said dial movable relative thereto, a fuel rate measuring device having an output proportional to the logarithmic function of the fuel flow rate therethrough, a velocity measuring device having an output shaft, an eccentric linkage, means responsive to the velocity of the vehicle to actuate said linkage to drive said output shaft in proportion to the logarithmic function of the vehicle velocity; and a telemetering circuit including a transmitter operable by the output of said device, a transmitter operable by said shaft, and a receiver connected to each of said transmitters to angularly displace said dial and said pointer relative to each other to give the efficiency rating of the vehicle in linear distance per unit of fuel measure.

6. An indicating system for an automotive vehicle comprising, a movable dial, a logarithmic scale on said dial in linear distance per units of fuel measure, a pointer for said dial movable relative thereto, a fuel rate measuring device having an output proportional to the logarithmic function of the fuel flow rate therethrough, and a velocity measuring device having an output proportional to the logarithmic function of the velocity of the vehicle, a telemetering circuit including a transmitter operable by the output of said fuel rate measuring device, a second transmitter operable by said velocity device, and a receiver connected to each of said transmitters to move said dial and said pointer relative to each other to give the efficiency rating of the vehicle in linear distance per unit of fuel measure.

ROY C. SYLVANDER.

REFERENCES CITED

The following references are of record in the file of this patent:

UNITED STATES PATENTS

| Number | Name | Date |
|---|---|---|
| 1,389,830 | Horne | Sept. 6, 1921 |
| 1,401,315 | Clark | Dec. 27, 1921 |
| 1,435,422 | Schiske | Nov. 14, 1922 |
| 1,506,625 | Forster | Aug. 26, 1924 |
| 1,533,530 | Wheatley et al. | Apr. 14, 1925 |
| 1,955,754 | Lyon | Apr. 24, 1934 |
| 2,078,982 | Stark | May 4, 1937 |
| 2,248,030 | Zwack | July 1, 1941 |
| 2,250,739 | Ahlstrom et al. | July 29, 1941 |
| 2,311,848 | Luhrs | Feb. 23, 1943 |
| 2,395,042 | Flatt | Feb. 19, 1946 |

FOREIGN PATENTS

| Number | Country | Date |
|---|---|---|
| 197,321 | Great Britain | July 10, 1924 |
| 247,314 | Great Britain | Feb. 18, 1926 |
| 649,148 | France | Aug. 21, 1928 |